United States Patent [19]
Jones

[11] Patent Number: 6,073,761
[45] Date of Patent: Jun. 13, 2000

[54] RECYCLABLE ARTICLE PACKAGING SYSTEM

[75] Inventor: William C. Jones, East Sandwich, Mass.

[73] Assignee: Emerging Technologies Trust, Osterville, Mass.

[21] Appl. No.: 09/309,903

[22] Filed: May 11, 1999

[51] Int. Cl.[7] .......................... B65D 69/00; B65D 71/00; B65D 81/02

[52] U.S. Cl. .......................... 206/223; 206/497; 206/583

[58] Field of Search .................................. 206/495, 497, 206/583, 223

[56] References Cited

U.S. PATENT DOCUMENTS

| | | | |
|---|---|---|---|
| 2,980,245 | 4/1961 | Stoker, Jr. ............................. | 206/495 X |
| 3,507,383 | 4/1970 | Rorer .................................... | 206/497 X |
| 3,905,474 | 9/1975 | Haibara . | |
| 4,307,804 | 12/1981 | Benham ................................. | 206/497 |
| 5,323,896 | 6/1994 | Jones . | |
| 5,388,701 | 2/1995 | Ridgeway ............................. | 206/583 |
| 5,676,245 | 10/1997 | Jones . | |
| 5,678,695 | 10/1997 | Ridgeway et al. . | |
| 5,694,744 | 12/1997 | Jones . | |

*Primary Examiner*—Bryon P. Gehman
*Attorney, Agent, or Firm*—Richard P. Crowley

[57] ABSTRACT

The present invention is an article packaging system which can be easily recycled. In one embodiment, the packaging of an article comprises a sheet member comprising a base portion and first and second end portions foldable with respect to the base portion, and a film member comprising a first end portion and a second end portion, the first and second end portions being removably attached to the first and second end portions of the sheet member, respectively. More particularly, the first and second end portions of the film member comprise a pocket adapted to engage with the first and second end portions of the sheet material, respectively. In operation, the film member and the sheet member may be separated from each other after use for recycling.

19 Claims, 8 Drawing Sheets

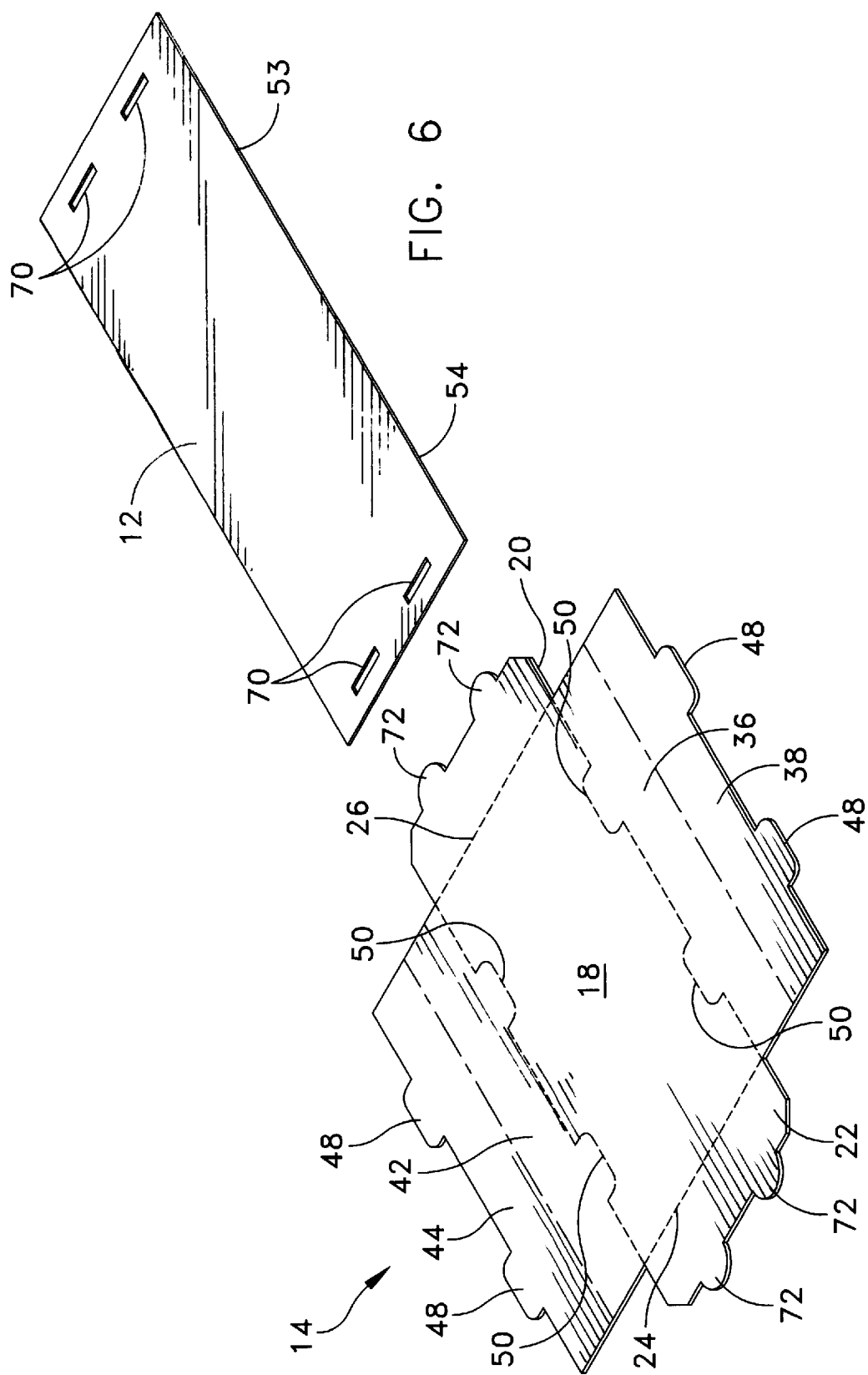

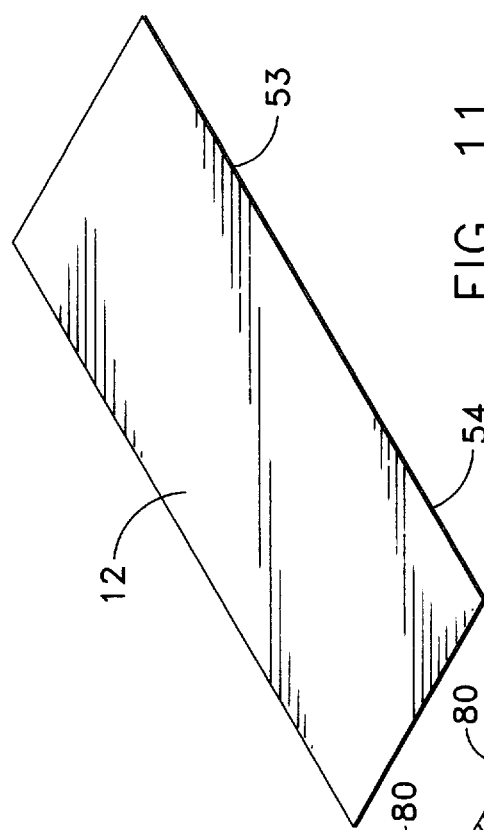
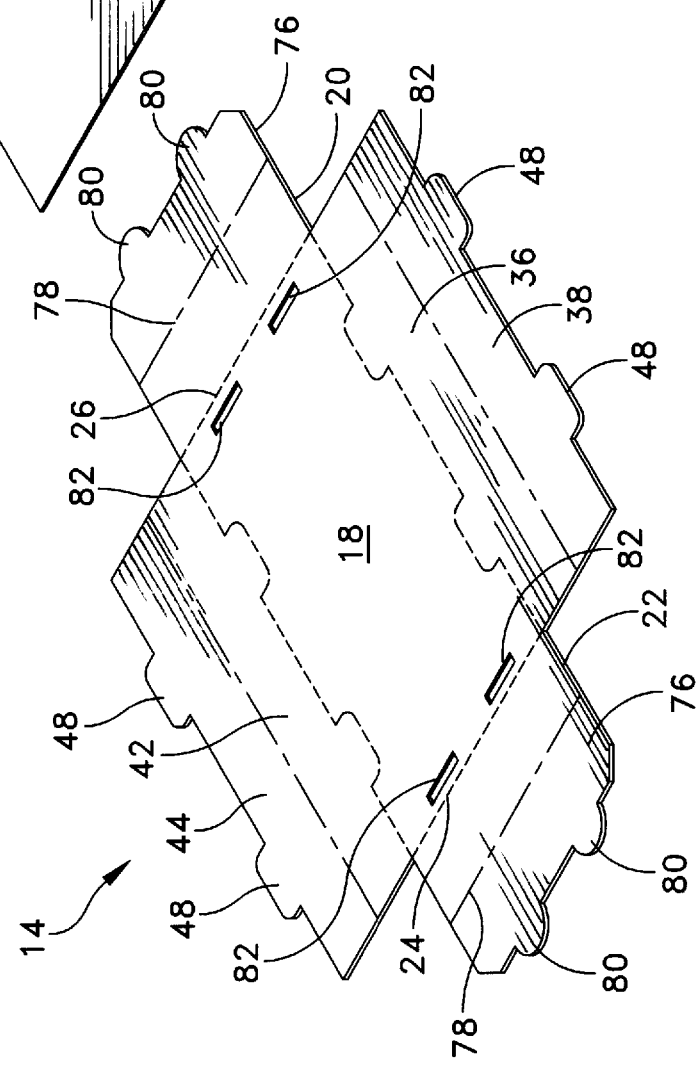
FIG. 11
FIG. 10

RECYCLABLE ARTICLE PACKAGING SYSTEM

FIELD OF THE INVENTION

The present invention relates generally to article packaging systems. More particularly, the present invention relates to an article packaging system using corrugated and sheet film materials.

BACKGROUND OF THE INVENTION

The need to recycle paper and plastic products is obviously clear. When packaging any one of a variety of products for transportation and/or sale, a combination of paper or corrugated boards and plastic films are often used together to form an article packaging container and/or system. Such systems are not readily susceptible to recycling, because the plastic films are adhesively attached to one or more portions of the corrugated board.

One object of the present invention is to provide a packaging system which uses corrugated board and plastic film, and wherein, both the corrugated board and plastic film can be easily discarded for recycling.

SUMMARY OF THE PRESENT INVENTION

The present invention is an article packaging system which can be easily recycled. In one embodiment, the system for packaging an article comprises a sheet member comprising a base portion and first and second end portions, foldable with respect to said base portion, and a film member comprising a first end portion and a second end portion, said first and second end portions being removably attached to said first and second end portions of said sheet member, respectively. More particularly, the first and second end portions of said film member comprise a pocket adapted to engage with said first and second end portions of said sheet material, respectively. In operation, the film member and said sheet member may be separated from each other after use for recycling.

BRIEF DESCRIPTION OF THE DRAWINGS

The following detailed description of the invention will be more fully understood with reference to the drawings in which:

FIG. 5 is a plan view of the sheet member of the second embodiment;

FIG. 6 is a plan view of the film member of the second embodiment;

FIG. 10 is a plan view of the sheet member of the third embodiment;

FIG. 11 is a plan view of the film member and film member of the third embodiment;

DETAILED DESCRIPTION OF THE PREFERRED EMBODIMENTS

Figure 1:
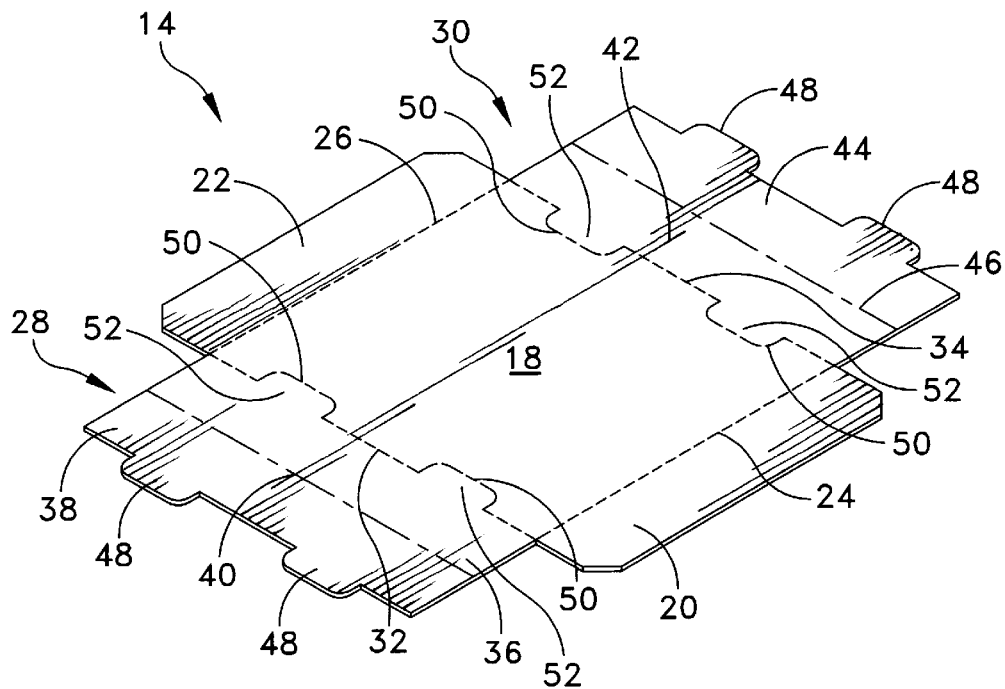
FIG. 1 is a plan view of the sheet member of the first embodiment of the present invention.
Figure 2:
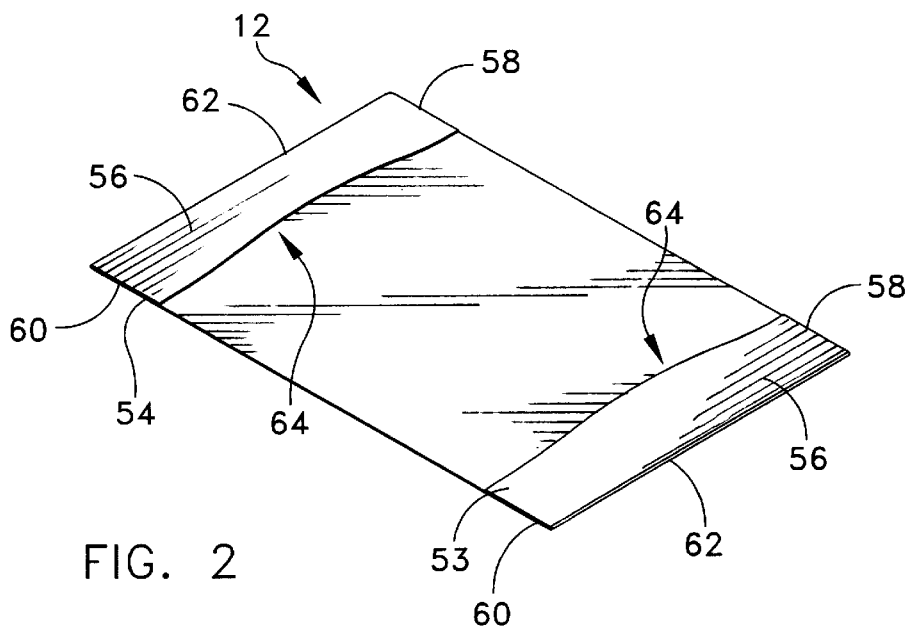
FIG. 2 is a plan view of the film member of the first embodiment of the present invention.
Figure 3:
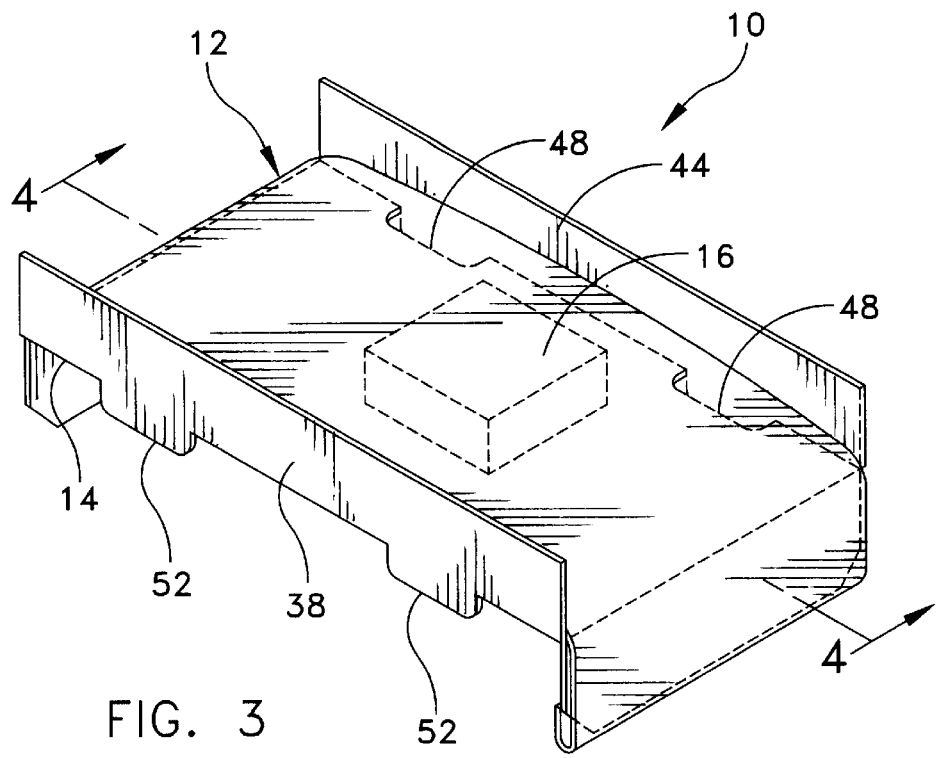
FIG. 3 is a perspective view of the first embodiment of the present invention.
Figure 4:
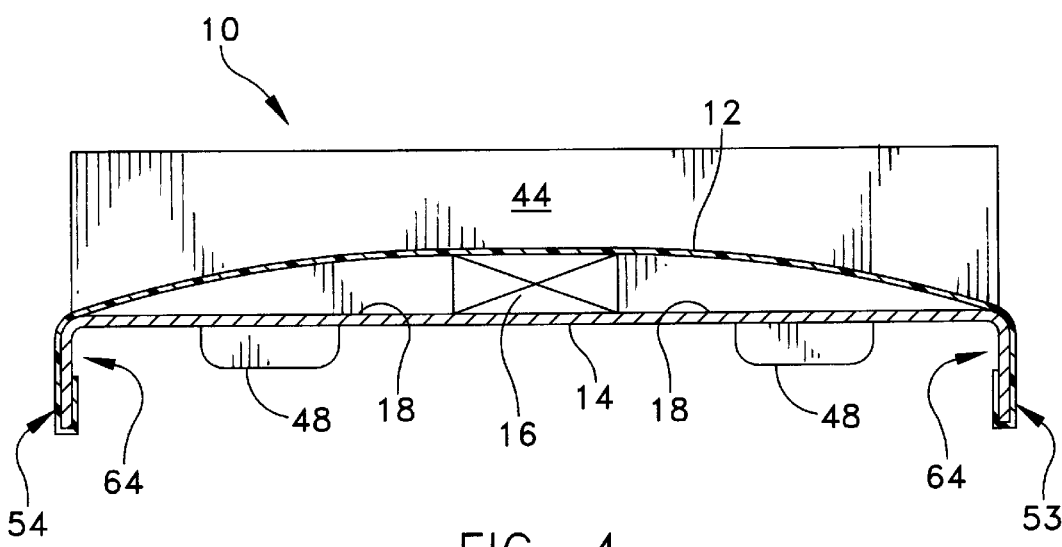
FIG. 4 is a cross-sectional taken along line 4—4 of FIG. 3.

Referring to FIGS. 1–4 wherein a first embodiment of the article packaging system 10 of the present invention is shown, the article packaging system 10 generally comprises a film member 12 removably attached to a sheet member 14. The film member 12 and the sheet member 14 operate from an "article insertion position" whereby an article 16 may be inserted between the film member 12 and the sheet member 14 to an "article retention position" whereby the article 16 is secured between the film member 12 and the sheet member 14. After use of the article packaging system 10, the film member 12 may be easily removed from the sheet member 14 and each may be discarded for recycling. The article packaging system 10 may be used alone or in connection with other packaging components. By way of example only, one or more article packaging systems 10 may be placed within a box or container for storage, shipping, and/or sale.

The sheet member 14 comprises a base portion 18 and first and second end portions 20 and 22, which are foldable about fold or score lines 24 and 26, respectively. In the embodiment shown, the first and second end portions 20 and 22 are folded downwardly. The sheet member 14 further comprises first and second side portions 28 and 30, foldable about fold or score lines 32 and 34, respectively. First side portion 28 comprises end portions 36 and 38, foldable about a fold or score line 40. End side portion 36 comprises a protrusion or leg portion 52 formed about a cut-line or ident 50. End side portion 38 comprises a protrusion or leg portion 48. Second side portion 30 comprises end side portions 42 and 44, foldable about a fold or score line 46. End side portion 42 comprises a protrusion or leg portion 52 formed about a cut-line or ident 50. End side portion 44 comprises a protrusion or leg portion 48. In the embodiment shown, end side portion 44 is folded about end side portion 42 which is folded upwardly to a position substantially perpendicular to the base portion 18, whereby leg protrusions 48 and 52 are secured within the slits or idents 50. The leg protrusions 48 and 52 may also act as legs or spacers for stacking of multiple article packaging systems 10. In the embodiment shown, the first and second end portions 20 and 22 can be folded about fold lines 24 and 26, independent of the first and second side portions 28 and 30 being folded about fold lines 32 and 34. The sheet member 14 may be made from a variety of materials. Preferably, the sheet member 14 is made from a corrugated cardboard material.

The film member 12 comprises a first end portion 53 and a second end portion 54. The first and second end portions 36 and 38 are adapted to be removably attached to the first and second end portions 20 and 22 of the sheet member 14, respectively. The first and second end portions 53 and 54 each comprise a pocket 56 adapted to engage with the first and second end portions 20 and 22 of the sheet material 12, respectively. Each of the pockets 56 generally comprise first and second closed side portions 58 and 60, a closed rear portion 62 and an open front portion 64, which is adapted to slide over the first and second end portions 20 and 22 of the sheet member 14. The film member 12 may be made from a variety of materials. Preferably, the film member 12 is made from a transparent thin sheet of stretchable polymer film. By way of example only, the film member 12 may alternatively be made from a plastic packing material having a plurality of bubbles.

In operation, the film member 12 may be removably attached to the sheet member 14 by placing or engaging pockets 56 within the first and second end portions 20 and 22 of the sheet material 12. Thereafter, an article 16 may be placed between the film member 12 and the sheet member 14 when unfolded or in the "article insertion position." Thereafter, the first and second end portions 20 and 22 may be folded downwardly causing the film member 12 to become tightly stretched about the article 16 to secure the same. This is called the "article retention position." Similarly, the first and second end portions 28 and 30 may be folded by side portions 38 and end 44 being folded about end portions 36 and 42, which are folded upwardly to a position substantially perpendicular to the base portion 18, whereby leg protrusions 48 and 52 are secured within the slits and idents 50. After use of the article packaging system 10, the film member 12 may be easily removed from the sheet member 14 and each may be discarded for recycling.

Figure 7:
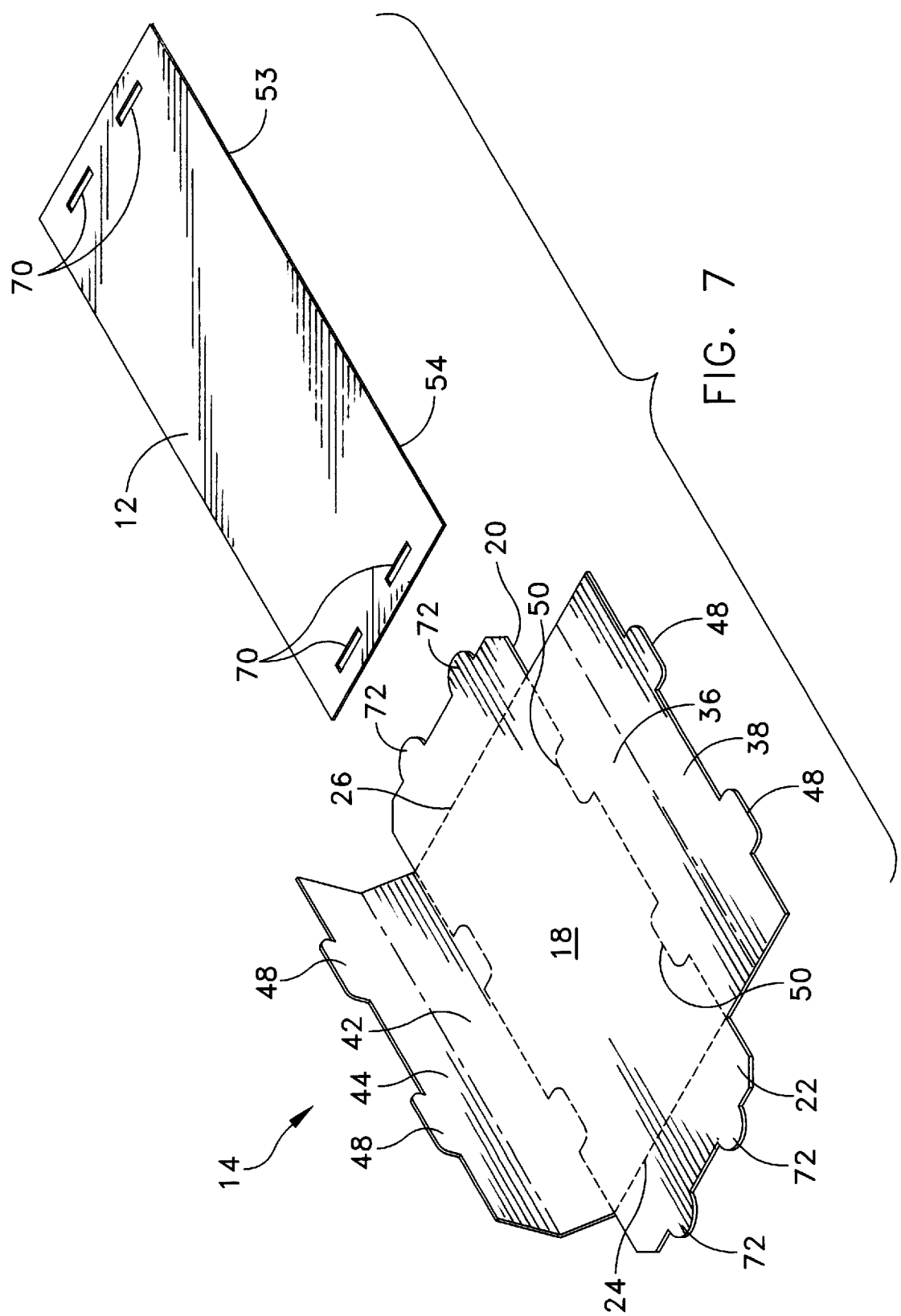
FIG. 7 is a perspective view of the sheet and film member of the second embodiment.
Figure 8:
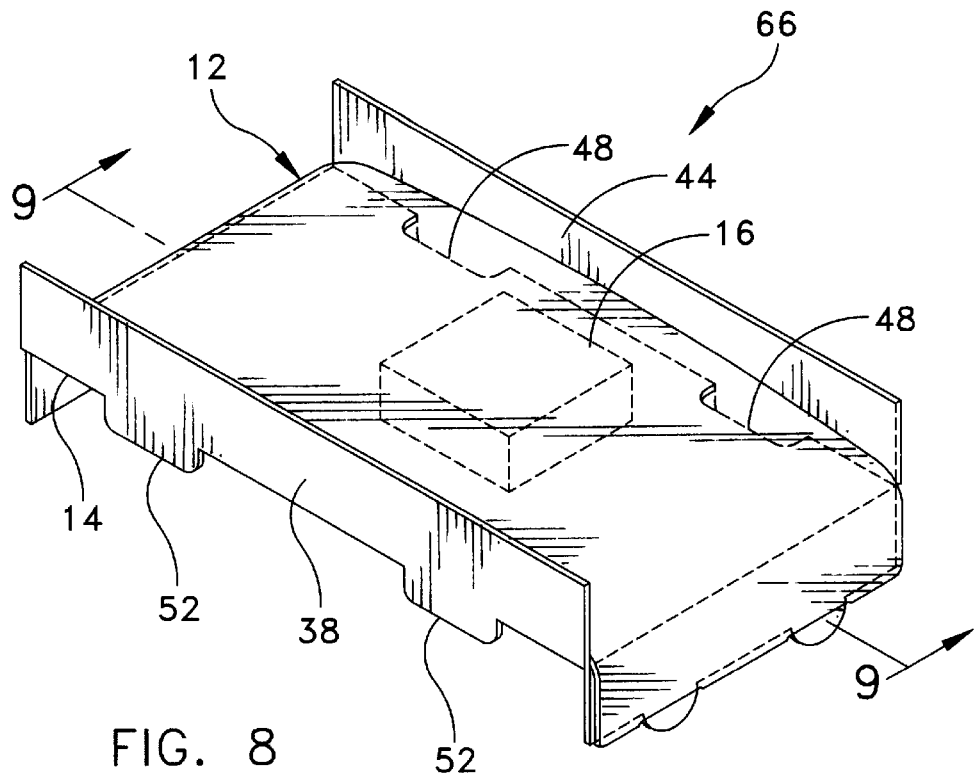
FIG. 8 is a perspective view of the second embodiment of the present invention.
Figure 9:
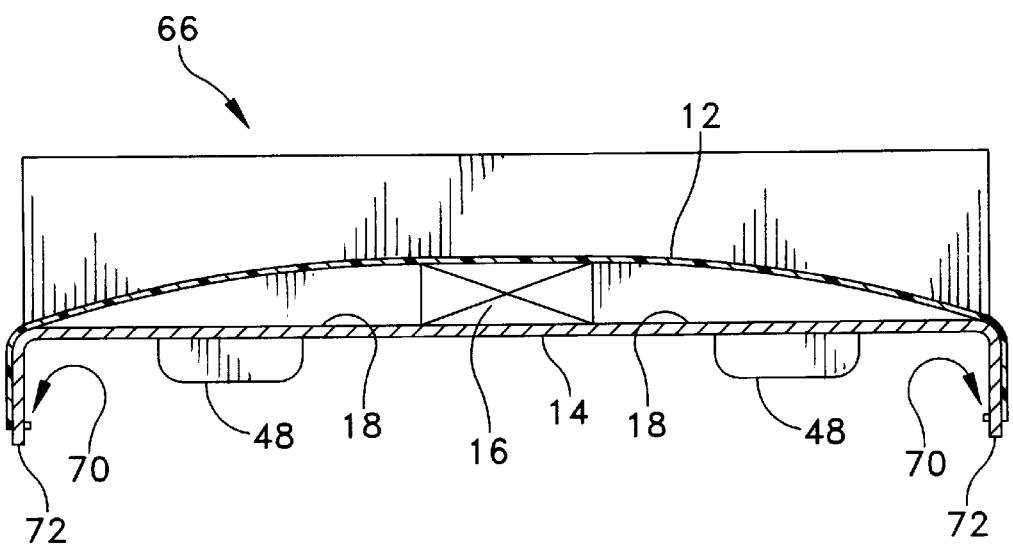
FIG. 9 is a cross-sectional view taken along line 9—9 of FIG. 8.

Referring to FIGS. 5–9, wherein a second embodiment of the article packaging system 66 of the present invention is shown, the embodiment of the article packaging system 66 is similar to the first embodiment except that: (1) the first and second end portions 20 and 22 of the sheet member 14 comprise a plurality of protrusions 72; and (2) each of the pockets 56 of the film member 12 have been replaced with a plurality of slits or slots 70. The film member 12 is removably attached to the sheet member 14 by engaging the slots 70 of the film member 12 with the protrusions 72 of the sheet member 14 to thereby secure the film material 12 to the sheet material 14. When end portions 20 and 22 are folded downwardly, tension is applied to the film member 12 to secure the article 16 between the film member 12 and the sheet member 14.

Figure 12:
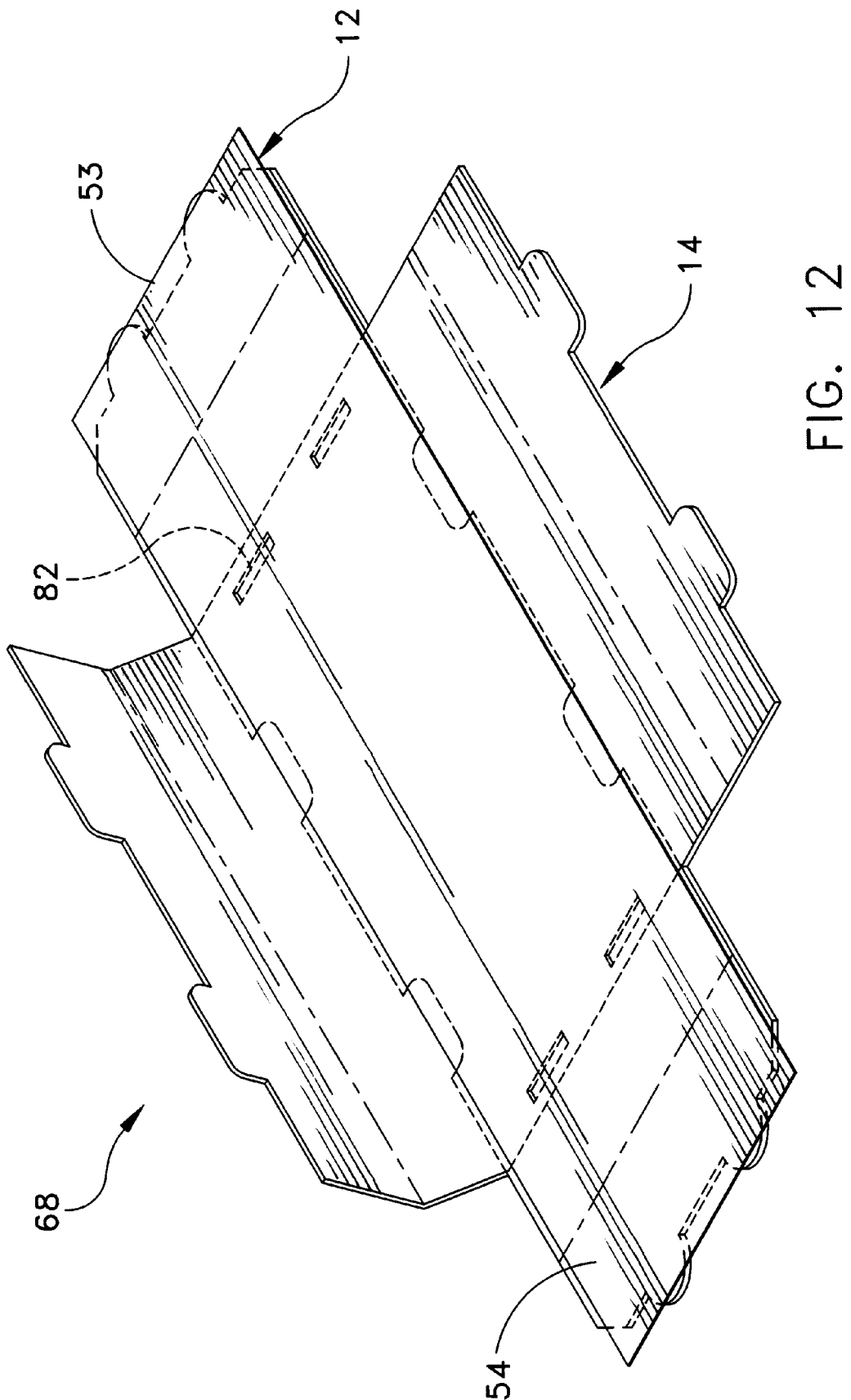
FIG. 12 is a perspective view of the sheet member of the third embodiment.
Figure 13:
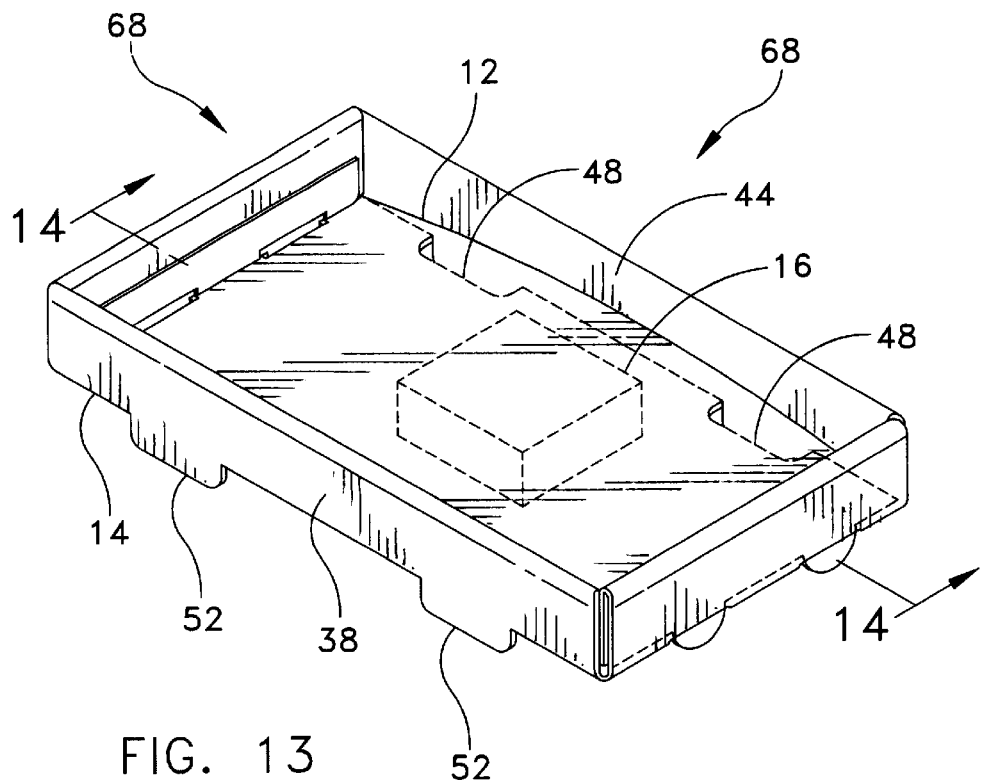
FIG. 13 is a perspective view of the first embodiment of the present invention.
Figure 14:
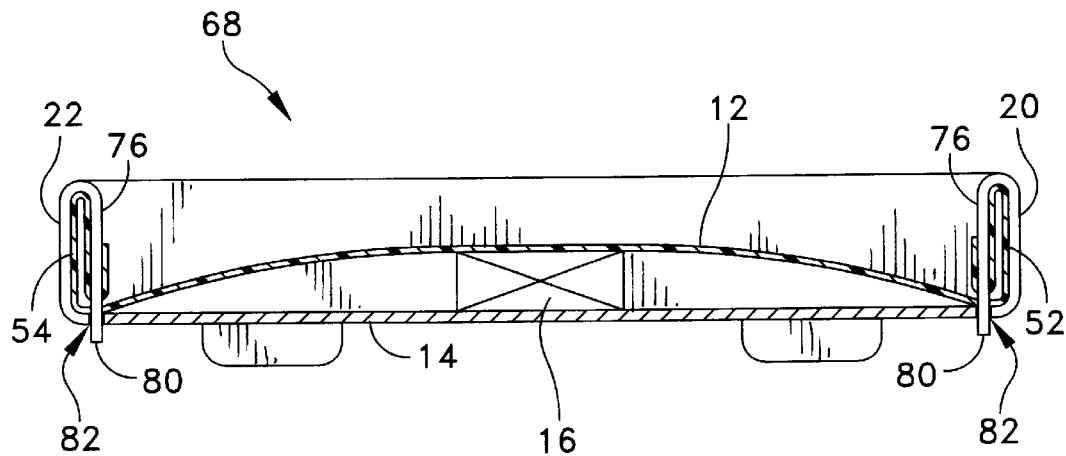
FIG. 14 is a cross-sectional view taken along line 14—14 of FIG. 13.

Referring to FIGS. 10–14, wherein a third embodiment of the article packaging system 10 of the present invention is shown, the third embodiment of the article packaging system 68 is similar to the first embodiment except that: (1) additional end portions 76 are foldably attached about fold or score lines 78 to each of the first and second end portions 20 and 22 of the sheet member 14; (2) each of the end portions 76 have a plurality of protrusions 80; (3) the base portion 18 is provided with a plurality of slits or slots 82 positioned adjacent fold or score lines 24 and 26; and (4) the film member 12 does not contain any pockets 56. The film member 12 is removably attached to the sheet member 14 by end portion 53 being folded between the first end portion 20 and end portion 76 and by end portion 54 being folded between the second end portion 22 and end portion 76. Each of the end portions 76 are folded upwardly and adjacent the first and second end portions 20 and 22, respectively, such that the protrusions 80 are engaged with the slits or slot 82 to thereby secure the film material 12 within the sheet material 14 and to apply tension to the film member 12 to secure the article 16 between the film member 12 and the sheet member 14.

Although not shown in the drawings, the base portion 18 of the sheet member 14 may comprise one or more fold or score lines positioned across the base portion 18 and parallel to the fold lines 26 and/or 34. Such fold or score lines 26 and/or 34 allow the base portion 18 to be folded, causing the film member 12 to be loosened (if the film member is tight when the base portion 18 is not folded or is planar), so that an article 16 may be placed between the film member 12 and the sheet member 14.

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

What is claimed is:

1. A system for packaging an article comprising:
   a) a sheet material comprising a base portion and first and second end portions foldable with respect to said base portion; and
   b) a film member comprising a first end portion and a second end portion, wherein each of said first and second end portions of said film member comprise a pocket adapted to engage removably with said first and second end portions of said sheet material, respectively; and whereby said film member and said sheet material may be separated from each other after use for recycling.

2. The system of claim 1 wherein each of said pockets comprise first and second closed side portions, a closed rear portion and an open front portion adapted to slide over said first and second end portions of said sheet material, respectively.

3. The system of claim 2, wherein said film member, with said first and second end portions and said pockets are made from a single piece of material.

4. The system of claim 1 wherein said sheet material further comprises first and second side portions with first and second fold lines which are foldable with respect to said base portion.

5. The system of claim 4, wherein said sheet material further comprises third and fourth side portions with third and fourth fold lines, and said first and second side portions of said sheet material being foldable about said third and fourth fold lines, respectively.

6. The system of claim 5, wherein said first and second end portions of said sheet material may be folded about said first and second fold lines, independent from said first and second side portions of said sheet material being folded about said third and fourth fold lines.

7. The system of claim 4 wherein the sheet material includes, adjacent each of the first and second fold lines, a pair of spaced-apart slits, and said first and second side portions each include leg portions adapted to fit into said slit, respectively, on folding of said side portions.

8. The system of claim 1 which includes a packaged article on the base portion and which article is retained in an article retention position between the base portion and the film member.

9. The system of claim 1 wherein the film member comprises a transparent, stretchable, polymeric film material or a plastic film material having a plurality of bubbles, and wherein the sheet material comprises a corrugated cardboard material.

10. A system for packaging an article, which system comprises:
   a) a sheet material comprising a base portion and first and second end portions foldable along first and second fold lines with respect to said base portion;
   b) a film member comprising a first end portion and a second end portion; and c) a film member securing means to secure and hold removably the film member to the sheet material in an article retention position, which means includes at least one protrusion on each of said first and second end portions of the sheet material, and wherein the sheet material or the film member are characterized by at least one slot at the first and second end portions, respectively, of said sheet material or film member, the slots and protrusions arranged and constructed to provide for the removable engagement between the film member and the protrusions, whereby the film member and said sheet material may be separated from each other after use for recycling.

11. The system of claim 10 which includes a packaged article on the base portion and which article is retained in an article retention position between the base portion and the film member.

12. The system of claim 10 wherein the film member comprises one of a transparent, stretchable, polymeric film material or a plastic film material having a plurality of bubbles, and wherein the sheet material comprises a corrugated cardboard material.

13. The system of claim 10 wherein said sheet material comprises first and second side portions with first and second fold lines which are foldable with respect to said base portion.

14. The system of claim 1 wherein the sheet material includes, adjacent each of the first and second fold lines, a pair of spaced-apart slits, and said first and second side portions each include leg portions adapted to fit into said slits, respectively, on folding of said side portions.

15. The system of claim 1 wherein said sheet material comprises third and fourth side portions with third and fourth lines, and said first and second side portions of said sheet material being foldable about said third and fourth fold lines, respectively.

16. The system of claim 15 wherein said first and second end portions of said sheet material may be folded about said first and second fold lines, independent from said first and second side portions of said sheet material being folded about said third and fourth fold lines.

17. The system of claim 10 wherein the film member is characterized by a pair of spaced-apart transverse slots at the first and second end portions of the film member, and the sheet material includes a pair of spaced-apart protrusions at the first end portion and second end portion of the sheet material, the protrusions arranged and constructed to fit within said pair of slots.

18. The system of claim 10 wherein the sheet material is characterized by at least one transverse slot adjacent the first and second fold lines at each end portion of the sheet material.

19. The system of claim 18 wherein the sheet material includes third and fourth end portions along third and fourth fold lines, respectively, to fold adjacent the first and second end portions.

* * * * *